(12) United States Patent  
Tannenbaum (10) Patent No.: US 7,224,777 B1
(45) Date of Patent: May 29, 2007

(54) TIME-CONTROLLED MESSAGING SYSTEM

(75) Inventor: Mary C. Tannenbaum, Dallas, TX (US)

(73) Assignee: Union Beach, L.P., Dallas, TX (US)

( * ) Notice: Subject to any disclaimer, the term of this patent is extended or adjusted under 35 U.S.C. 154(b) by 121 days.

(21) Appl. No.: 10/727,177

(22) Filed: Dec. 3, 2003

(51) Int. Cl.
*H04M 1/64* (2006.01)

(52) U.S. Cl. .................. 379/88.23; 379/38; 379/88.12; 340/309.16; 368/246

(58) Field of Classification Search ............... 455/3.04, 455/88, 90.1, 41.2; 340/309.16; 379/38, 379/88.12, 88.22; 368/10, 246
See application file for complete search history.

(56) References Cited

U.S. PATENT DOCUMENTS

| | | | |
|---|---|---|---|
| 5,646,982 A * | 7/1997 | Hogan et al. ............ | 379/88.22 |
| 6,185,603 B1 | 2/2001 | Henderson et al. | |
| 6,192,396 B1 | 2/2001 | Kohler | |
| 6,442,573 B1 | 8/2002 | Schiller et al. | |
| 6,504,908 B1 * | 1/2003 | Bellomo et al. ............. | 379/38 |
| 6,643,684 B1 | 11/2003 | Malkin et al. | |
| 6,650,740 B1 | 11/2003 | Adamczyk et al. | |
| 6,816,703 B1 * | 11/2004 | Wood et al. ............... | 455/3.04 |
| 2004/0131162 A1 * | 7/2004 | Silver et al. ............. | 379/88.12 |
| 2006/0139150 A1 * | 6/2006 | Brue ..................... | 340/309.16 |

OTHER PUBLICATIONS

Readers Digest ad Dec. 2003, p. 22.

* cited by examiner

*Primary Examiner*—Gerald Gauthier
(74) *Attorney, Agent, or Firm*—Fulbright & Jaworski LLP (57) ABSTRACT

In one embodiment, there is disclosed a messaging system which allows a message originator to send a message to a message recipient, the message being presented to the recipient at a time selected by the message originator without any action being taken by the recipient. In a still further embodiment, the message sent by the originator can be supplemented by additional information, such as by a local temperature sensor, or by electronic data from a different source.

75 Claims, 4 Drawing Sheets

TIME-CONTROLLED MESSAGING SYSTEM

TECHNICAL FIELD

This invention relates to messaging systems and more particularly to systems and methods for allowing external control of the time a received message is played for the receiving user.

BACKGROUND OF THE INVENTION

For people in the early stages of Alzheimer's disease or memory loss, many activities of daily living become confusing, challenging or impossible. A key example is keeping track of time and calendar. Knowing the date or day of the week becomes difficult. Keeping track of activities scheduled for a specific day and time is overwhelming, if not impossible. Standard tools, such as clocks and calendars, may not provide sufficient information to eliminate confusion and provide the certainty needed. Even if the information provided via such a medium is understood, it may not be retained long enough for the person to act on it in a meaningful manner.

For a person with memory impairment, a standard calendar entry may not convey the information needed to result in appropriate action. Although the calendar may clearly indicate a haircut appointment on Wednesday, October 12 at 10:00 am, this may be meaningless information to a person who isn't sure if it is Wednesday, or even if it is October. Even if the person knows the day and time, that person may not be able to remember the appointment, even an hour later. Therefore, the recipient will be incapable of taking the appropriate steps to prepare for the appointment.

Although reminder calls from a third party can be helpful, such as when the Doctor's office calls the patient the day before to confirm the appointment, the call often does not provide the information in a timeframe that maximizes the chance of obtaining the desired result, especially from people with impaired memory. Also, information provided by telephone, or even by e-mail, can only be acted upon if it is, in fact, received. People with impaired abilities, such as memory, hearing or sight loss or who just are physically unable to operate an answering machine or computer, often can not see or hear their messages even when they are easily available.

Some systems exist in which messages can be sent to a receiving system and then played at a later time. For example, U.S. Pat. No. 6,442,573 describes a system that allows a sender to send one or more messages to a server. The recipient's system then calls the server at a preset time to retrieve the messages. Another system, described at page 22 of the December 2003 issue of Readers Digest describes a system that allows a sender to send messages to a recipients system. A light on the system indicates that the recipient has mail.

However, even when dementia has not taken its toll, some people can not reach or operate the telephone, or can not hear well enough to make telephone communication meaningful. Leaving messages for these folks is of little help, since many can not operate answering devices, read their email, or even be alert enough to remember to do so, assuming they possess the ability to operate the equipment.

BRIEF SUMMARY OF THE INVENTION

In one embodiment, there is disclosed a messaging system which allows a message originator to send a message to a message recipient, the message being presented to the recipient at a time selected by the message originator without any action being taken by the recipient.

In a further embodiment, the system could override the time, or delay the time, selected by the originator and present the message in accordance with a different protocol.

In a still further embodiment, the message sent by the originator can be supplemented by additional information, such as by a local temperature sensor, or by electronic data from a different source.

In a still further embodiment, the message originator could be a broadcast originator with the same message sent to a plurality of recipients with the time for presentation controlled by the originator.

In a still further embodiment, the message could be delivered to the recipient in a form, or forms, most suitable for that particular recipient regardless of the form the message is received from the originator.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The inventive concepts taught herein help to facilitate communication with folks having difficulty with their chores of daily living by allowing third parties, such as an adult child, or a professional caregiver, to send messages to the recipient and to have that message delivered at a time appropriate for the message.

In operation, the message sender communicates with a recipient's messaging system and records a message, or sends one or more preestablished messages for storage on the recipient system. In conjunction with the stored message, a date (or series of dates) and time (or series of times) and/or one or more other attributes, is recorded in association with the stored message. Each stored message will be played for the recipient at the time set forth in the recorded associated attributes without any action required on the part of the recipient. Optimally, one or more messages can be stored, either locally at the recipient's system, or on a server, and, at a time controlled by the sender, one or more of the stored messages displayed. The time to start the message could be associated with each message, or could be sent by the sender at a different time. Or, in one embodiment the identity of a message (for example something pre-delivered by the sender or pre-selected by the sender from a separate stored location) can be sent along with a play time and at the appropriate time the recipient system would download the message and play it for the intended recipient.

As one example, assume that Sue is scheduled to take her mother for a haircut at 10:00 a.m. on Wednesday, October 12. Anytime before the appointment, and perhaps when the appointment is first made, Sue (the originator) calls her mother's (the recipient) messaging system and prerecords one or more messages for delivery to her mother at times specified by Sue. Sue may choose the first message to be played on, say, Tuesday, October 11th at 7:00 p.m. That message might say, "Hi, Mom, this is Sue. I just called to remind you that you have a haircut appointment tomorrow morning at ten. I will pick you up after breakfast."

At 7:00 p.m. on Tuesday October 11th, with no further action either by Sue or by her mother, her mom will hear the message that was prerecorded days, or even weeks before. Based upon her mother's situation, the verbal message, in addition to being played orally, might be translated into video words on a screen, and/or video images of a barber, etc. The system could update or change the message based on the specific date (or time) the message is played.

Sue could also have recorded at least one other message to be played on Wednesday morning. One of these messages could play at 7:00 a.m. as a wake up reminder and another would play at 9:15 a.m. The 9:15 a.m. message could, for example, say, "Hi, Mom. This is Sue. I'll be there to pick you up in fifteen minutes to take you to get your haircut. Please be dressed and ready to go." If desired, Sue could optionally enter an attribute that tells the system to obtain the then current (at the time the message is played) weather conditions and to give that information to her mother along with dressing suggestions, appropriate to the then current weather.

Although Sue may supplement these messages with actual phone calls, pre-sent messages help to reinforce the information and provide it at critical times when it may not be possible for Sue to place a call.

Some locally stored messages, (which can be programmed to play without other messages) could be, for example, "Its raining today, don't forget your umbrella!" or "The temperature has really dropped—you'll need long sleeves and a jacket when you walk the dog." The exact message can be prerecorded by a sender, or could be pre-canned, either in a local device or a remote server. The appropriate message, or messages, could be triggered by external sensors at preset times, or triggered from an administrator, a clock, or even by a third party sender. The preset messages could be locally stored, or stored remotely and "asked" for at the appropriate times.

The message presentation systems and methods described herein can be customized to best fit the needs of the recipient. If the recipient is deaf, messages would be presented via a screen and the recipient notified of an incoming message via a flashing light. If a recipient needs to hear or see a message again, he/she presses a button marked "repeat" or some equivalent presented to the user in big letters. If desired, the recipient can be asked to respond to the message. This response could be orally or by a button press. The response would be communicated back to a message sender via a communication path identified in association (an attribute) of the originally recorded message.

The user could in some embodiments, become the originator as well as the recipient and thus could preprogram his/her own system for reminders, such as wake-up calls, at preset times or at times determined by external events, such as temperature, activity (wake-up, meals, GPS, calendar events, etc.) Such preset reminders could, for example, include messages based on a sensor read-out at the time of the message. Thus, for example, a user could set a message such as, "Time to get up. It's six-fifteen on Tuesday morning. The outside temperature is thirty-five degrees. The high today will be fifty degrees and no precipitation is predicted.

On your calendar for today, there is a haircut appointment for your mom at 10:00 a.m. and lunch at Rosies with friends. Don't forget to order theatre tickets." The words in bold in the preceding sentence would be obtained at the time the message is played from sensors or from other available data, such as the Internet. For example, the word "Tuesday" would come from a calendar sensor; the word "thirty-five" would come from a temperature sensor; the words "fifty" and the "no precipitation" could come from a search of the Internet, or from a radio broadcast, or other source. The calendar information would come from the user's electronic calendar. Attributes associated with the stored message would trigger the message play time, as well as the bolded words.

While the scenarios discussed herein are in conjunction with instructions recorded by a care-giver, there are any number of other uses for the concepts discussed. For example, a parent, or friend, of a child away in college (or of an elderly parent in a nursing home) could call the system and record messages to be played at certain times in the future. Thus, a parent could record birthday greetings to be delivered on the child's birthday or music to be played at a certain time. Or a traveling parent could prerecord a series of stories to be read to a small child every night at a time set for each story while the parent is away on business or pleasure. Each story would be played at a time set by the parent without any action required by the child. If desired, at the end of each story the parent could prompt a response from the child and that response will be held in memory, or communicated to the parent at a telephone (pager, email) number (or series of numbers) provided with the original recording. Under some situations, it might be appropriate to simply have the system go into open-mike mode where any sounds (or images, if desired) are communicated to the originating party. Of course, because of privacy concerns the use of such a feature must be carefully controlled.

In nursing home and hospital situations, the administration could send a broadcast message to a plurality of rooms, detailing the day's activities. This communication could be, for example, both oral and visual, and the visual presentation could be made to remain visible on the screen for a long period of time. Such a display could be, for example, a calendar of events for the day. An audio message could be played just prior to the time of each event, if desired. Message override control can be provided to enable messages at certain times without regard to the time stipulated in a message, or to prevent calls during certain time periods.

Figure 1:
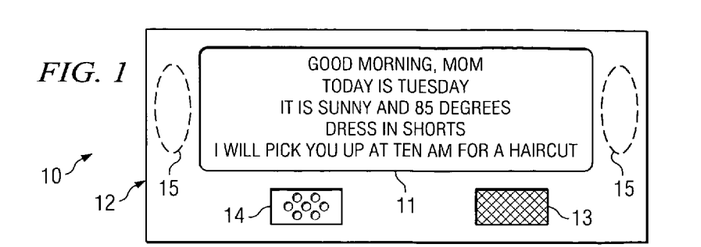
FIG. 1 is an illustration of an embodiment of a display.

Turning now to FIG. 1, there is shown display 10 which can, if desired, have visual display screen 11 surrounded by frame 12. Frame 12, in this embodiment, has speaker 13 and microphone 14. Display 10 is shown as a stand-alone unit, perhaps adaptable to hang on a wall. To facilitate wall hanging, screen 11 would advantageously be a flat panel, such as an LCD or other similar type of screen. Also, if desired, lights 15 (or any other attention getting device) could be fashioned into frame 12 so as to notify a hard-of hearing (or forgetful) person to look at the screen at the appropriate times. Display 10 can be built into other devices, and thus, can be part of a television set, radio, clock, cell phone, Global Position System (GPS) or even part of a conventional answering machine.

An example of a message delivery system with sender imposed delivery instructions is shown in U.S. Pat. No. 6,643,684 issued Nov. 4, 2003, which patent is hereby incorporated by reference herein. These instructions, or delivery policies, go along with the message on the internet and can if desired, include time of delivery information. This delivery time is the delivery time of the message to a particular machine and not to the end user.

Figure 2:
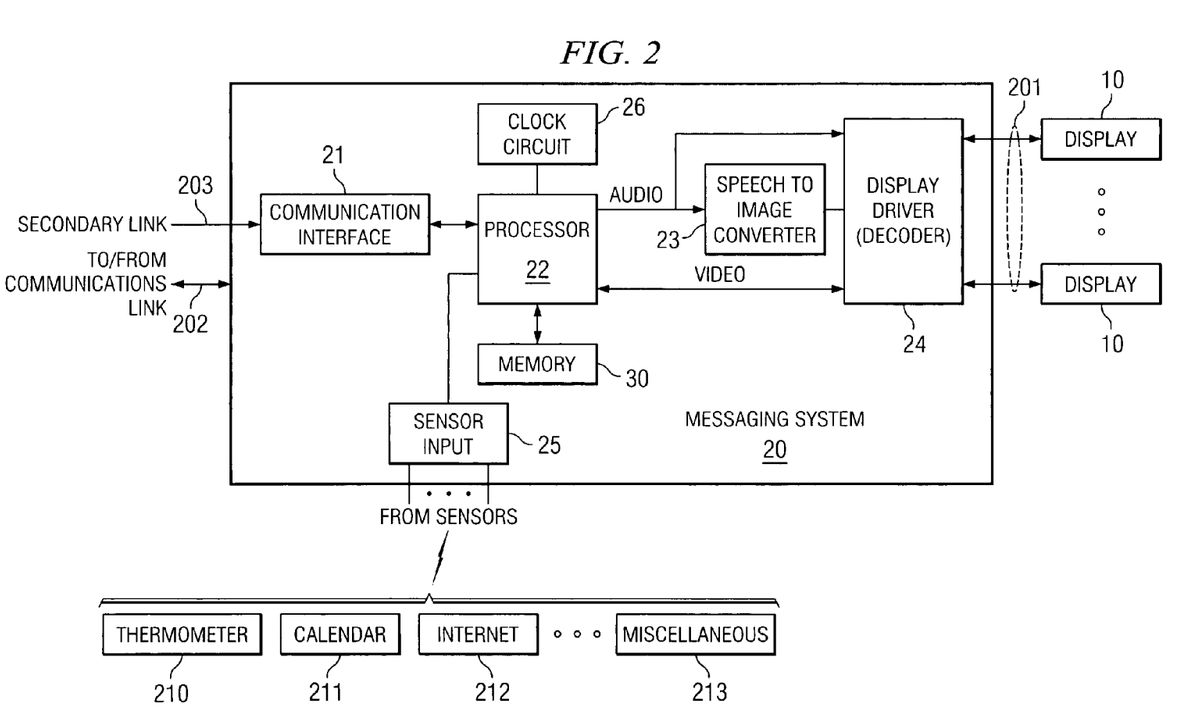
FIG. 2 is a schematic of an embodiment of the control for a messaging system.

FIG. 2 shows messaging system 20 operative to accept input from a communication link, such as link 202. Link 202 can be wireline or wireless, or can be the Internet and can be dedicated (i.e., having its own unique address) or can be shared with other equipment. Data can be delivered over a plurality of inputs, such as input 203 which also could be wireline or wireless. Some part of the message could come over, for example, line 202 and another part over line 203. A sender could download one or more message control codes together with message play times. At the appropriate control time, a signal could be sent from system 20 over, for example, line 203 to obtain the actual message from a remote server. Lines 202 and 203 could have different bandwidth, if desired, and different network connectivity. System 20, ideally would be located with the recipient, but could, if desired, be remote therefrom.

Figure 4A:
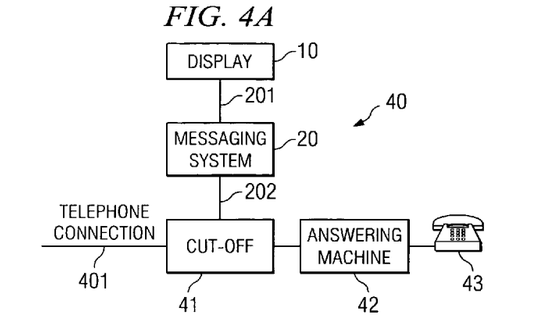
FIGS. 4A and 4B are block diagrams of messaging system embodiments.
Figure 4B:
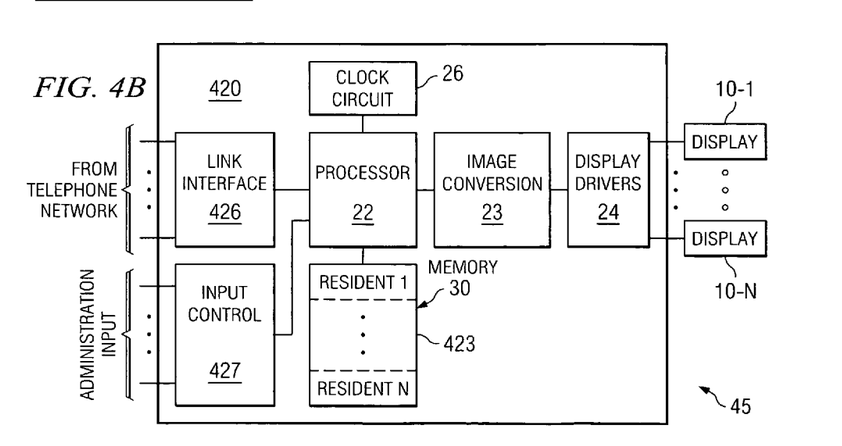

In a preferred embodiment, system 20 would have its own address, such as a telephone number or pager address. Power to the system could be externally supplied, or supplied by internal batteries or a combination thereof. System 20 can be designed to support a single display 10 (as shown in FIG. 4A), or multiple display 10s (as shown in FIG. 4B). Multiple displays based on the configuration of FIG. 4A could all broadcast the same information, for example, in different rooms. Multiple displays based on the configuration of FIG. 4B could be located in different recipient's rooms, for example, in the various resident rooms of an assisted living facility. In such a situation, each screen could display information unique to the intended recipient. The messaging system can be stand-alone (as will be described) or it can be part of one or more other devices.

An incoming communication would be directed, for example, by a public switched network, to input 202 (or to input 203) and then processed by communication interface 21 so as to provide answer supervision (if necessary) back to the calling party. Answer supervision should ideally occur without causing ringing of the recipient's telephone. Using pager technology, answer supervision would not be necessary and each message system 20 would ideally have its own unique address.

Communication interface 21 contains voice prompt circuitry for providing message control to a calling party. Voice prompt messages can be used to obtain from the calling party a proper PIN (if required), or other identity code, as well as, the desired message, the desired play time, or times and other attributes used for controlling the message. Interface 21 also obtains from the calling user any information, such as room number, if required, to access the system and any additional attributes, such as check temperature sensor, check calendar, check Internet at a specific address, check GPS, check medical sensor, etc. As will be seen, these message attributes are stored in conjunction with each message and then used, at each message play time, to control locally generated messages. Administration messages, and administration controlled time overrides can be entered via any of the inputs or via an administration input (not shown).

Processor 22, in conjunction with memory 30, controls interface 21 and controls the storage and retrieval of the proper information at the proper time. Clock circuit 26 provides the time and date in conjunction with processor 22.

When a receiving user is hearing impaired, speech to image converter 23 operates to convert audio input to a visual display (words and/or pictures) prior to sending the message data to display 10. Display driver 24 operates to format visual data for display 10 and if there are a plurality of such displays, serves to decode which display (or displays) is to be active. Driver 24 is also operative, if desired, to size the visual images to suit the recipient such that a visually impaired person would receive a larger type face image than would a person having normal vision. Processor 22 (or, if desired, a separate control circuit) serves to adjust the sound levels for audio depending upon the recipient's hearing acuity.

Sensor input 25 serves to connect system 20 to the various sensors, such as thermometer 210, external calendar 211, Internet 212, radio, or other misc. sensors 213, which could, for example, be medical sensors, GPS sensors, etc. These connections can be hard wired, but are preferably wireless, or a combination thereof. It should also be understood that the component arrangement and component interaction shown in FIG. 2 is only one embodiment and those skilled in the art can establish a messaging system using numerous other combinations.

Figure 3:
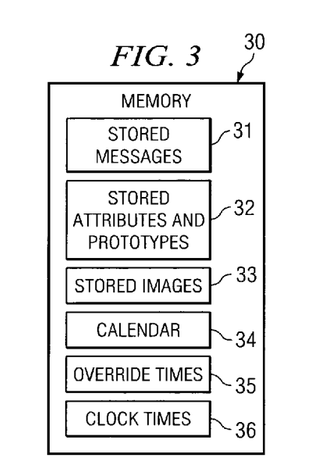
FIG. 3 is a block diagram of an embodiment of a memory structure for controlling a messaging system.

Turning now to FIG. 3, there is shown one embodiment of memory 30 having partitions therein for performing several functions. Memory partition 31 stores messages received from a sender as well as fixed messages that can be triggered by a message sender. Such fixed messages could be, for example, "It is cold outside today. Dress warmly." This message could be triggered by an attribute sent within a message (or instead of a message). These attributes, can be identified by respective codes, such as #3 for temperature, #4 for calendar, etc. The attributes for a given message are stored in memory partition 32 and keyed to the proper message in partition 31. The code to trigger an attribute could, for example, be a word, such as "temperature," a number, a tone, or any combination thereof.

Image data that is received from a sender, as well as prestored image data, is stored in memory partition 33. If desired, calendar partition 34 can keep a personal calendar for the recipient and can be used in conjunction with one or more remote calendars 211 (FIG. 2). Override partition 35 stores data used to modify recipient provided play times. This override could be to make all messages play within a certain block of time or could be used to prevent messages from playing for certain periods, for example, during the night.

The data in override partition 35 could be used to set certain preset times and the sender could select such preset times by using a code to identify such times. Such a code could be used instead of providing a specific play time with the message.

For example, the sender might not know the recipient's wake up time, but wants a particular message played at wakeup. A code could identify this attribute of a message and the local system (either on administrator, or the recipient, or a caregiver) would set the wakeup time. Also, a sender could send a code to trigger one or more messages (whether generated by the sender or pre-canned based on an external event occurring at the recipient's location. These external events could be, for example, temperature, calendar-event, GPS position, time, medical condition of the recipient, user activity. Clock time partition 36 is used to store the play times as determined by the message sender. These times are keyed to the proper message stored in memory portion 31 and to the proper attributes stored in memory partition 32. Note that the arrangement of memory 30 as shown in FIG. 3 is but one embodiment and many database and memory structures could be used to maintain the proper association of messages with play times and other attributes.

FIG. 4A shows one embodiment of messaging system 40 in which incoming telephone line(s) 401 is connected through cut-off 41 to traditional answering machine 42 and/or telephone 43. Since one of the advantages of the messaging system is that incoming messages are delivered to the recipient under control of the sender, it is not advantageous to have telephone 43 or answering machine 42 (if supplied) answer the call. In such a situation, cut-off 41 senses a signal (or other data) on the incoming call and routes the incoming call to messaging system 20. In situations where messaging system 20 is part of answering machine 42, the incoming ringing is turned off and the call is routed to a special memory, or memory section, within the answering machine and then processed as discussed with respect to FIG. 2. For such a situation, answering machine 42 answers the call but blocks audible ringing. The message is recorded, but the play back time is controlled by the message sender and not by the message recipient.

FIG. 4B illustrates system 45 designed to handle multiple recipient displays 10-1 to 10-N by common control circuit 420. Line interface 426 operates similarly to interface 21, but, if desired, handles multiple incoming lines. Memory 30 is partitioned to keep the various residents (message recipients) separate. This partition can be permanent, or can be established when, and if, messages have been stored for a particular resident. Using this embodiment, the system administrator (not shown) can easily place messages in each mailbox for subsequent delivery to selected ones of devices 10-1 to 10-N. The administrator can input messages, or time control for messages, either through interface 426 or directly through input control 427 which could be wireline or wireless.

Figure 5:
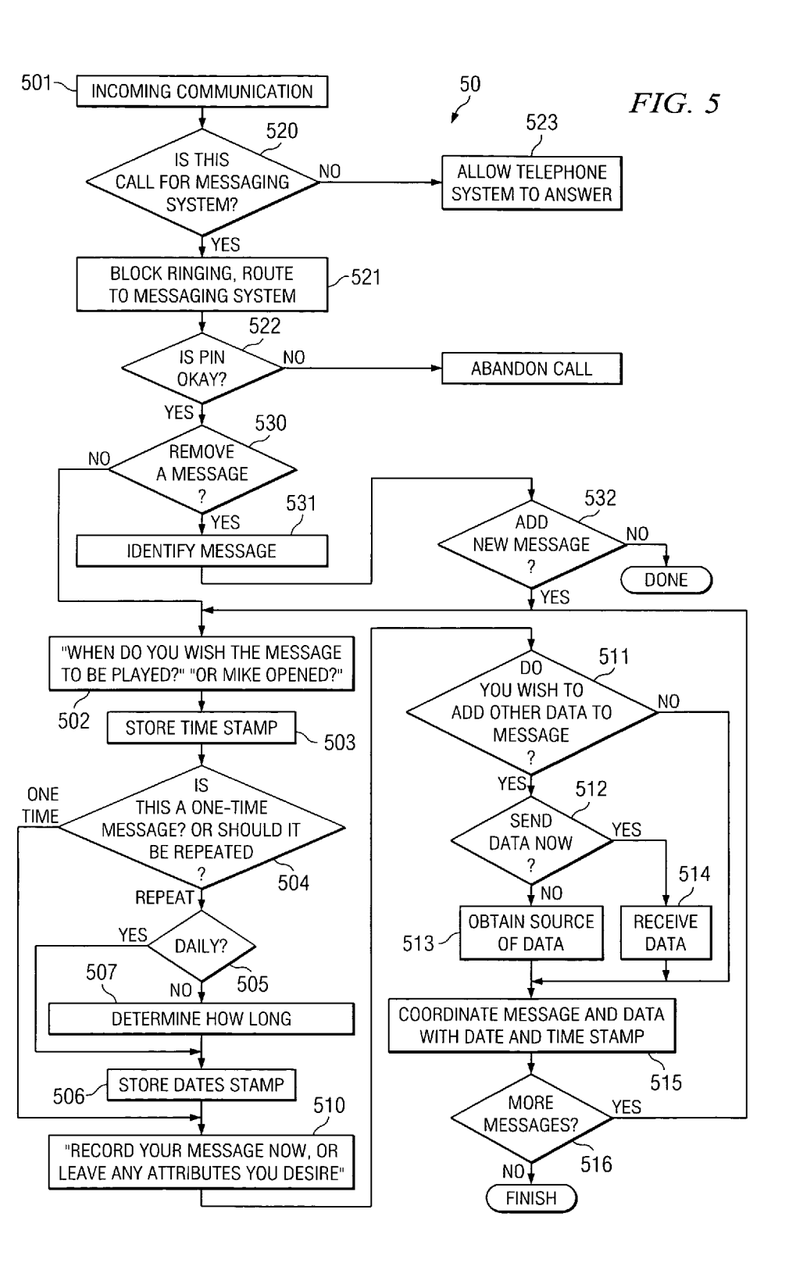
FIGS. 5 and 6 are embodiments of flow charts for messaging system control.

FIG. 5 shows one embodiment 50 of a flow chart for processing incoming communications for message storage. Process 50 operates, for example, under control of processor 22, memory 30, and communication interface 21 of FIG. 2. Process 501 begins the call flow. Process 520 is optional and only necessary when the system is used in conjunction with an answering machine, telephone, or another device, as set forth in FIG. 4A. If the call is not for the messaging system, then the system allows a telephone, or answering system, or any other apparatus, such as a television set to function properly under control of process 523.

However, if the call is for the messaging system, then process 521 blocks the ringing and routes the communication to the messaging system. Process 522 is optional and checks for PIN or other information. Processes 530, 531 and 532 are optional and serve to control the situation where an appointment has been changed (or for any reason a message is to be changed) and it is desired to change, or eliminate, a previously stored message.

If all is proper, the incoming communication goes to process 502 which can be a interactive voice response unit or any other type of prompt which asks the sending user certain questions such as, "When do you wish the message to be played," or, "when do you wish the mike to be opened." The sending user then responds verbally or by keypad entry with a time. This time is stored under process 503 in clock time partition 36 of memory 30 (FIG. 3). Process 504 determines if this is a one-time message or is to be repeated. This determination is made interactively or by asking for a code from the sending user. This code could be spoken, key-punched, or part of a pre-packaged message sent from the calling user.

In some situations the calling user will be using a telephone, in other situations the calling user will be sending an email or other message from a computer via the Internet. If a message is to be a repeat message, blocks 505 and 507 determine if it is a daily message or for how long the message is to be repeated. The dates are stored via process 506 and the call flow moves to process 510 in which the user is asked to record the message or to leave any attributes desired. The attributes would be, for example, temperature, calendar, or any one of a number of other desired local operations, where a code is put into the message to control the attribute at the proper time. The code could be a symbol, a number or a voice command.

For example, the sending user could leave a message, as discussed above, that says, "Hi Mom. I just want to remind you of your haircut appointment in fifteen minutes. The temperature outside is attribute temperature." When the system hears the word "attribute" it then knows to listen for the next word to determine which attribute is to be recorded. The system could, for example, be established so that the sending user could be prompted to push buttons on the keypad for different attributes to be left as part of the message.

As discussed, messages can be audio, video, still video, graphic or combinations thereof. Video could also include messages that are photographs or pictures that are to be displayed for the receiver for a period of time at a given time under control of the sending user.

Process 511 controls the addition of other data to the message. This other data could include messages that are prestored in memory 30, or could include messages that are transferred into memory 30 under control of processes 512, 513, and 514. If the data for the message is not sent by the message sender, then process 513 obtains the source of the data from the sender. The data is either then obtained, or the source identity of the data is stored for later use in obtaining the message data. All of this information is coordinated under control of process 515 and the data entered into memory 30 in the various partitions thereof, as discussed above.

Process 516 determines if there are more messages. If there are more messages the system repeats. If there are not, it is finished.

Process 50 can be performed in a system 20 that is unique to a recipient or process 50 can be performed at a location central to a plurality of potential recipients. The message sender could download a database of files, information, stories, readings, pictures, music, video at a given time. Then either concurrently with such downloading, or at some period thereafter, the sender could issue an instruction to the recipient's system instructing the recipient's system to present any one of the downloaded data to the recipient. This data can be orally delivered by the recording user, or could be transmitted from a database either directly from the recording user or from an intermediary third party. In a third-party scenario, the sending user could contract with the third party so that the third party then would download information for storage in association with the receiving user, alternatively, each of the messages could have a unique identification code and the sending user then would send the message identification code and a message play time and perhaps other attributes for controlling the display of the information. At the appropriate time, as controlled by the message play time the information from the third party would be called by the prestored identification code.

Figure 6:
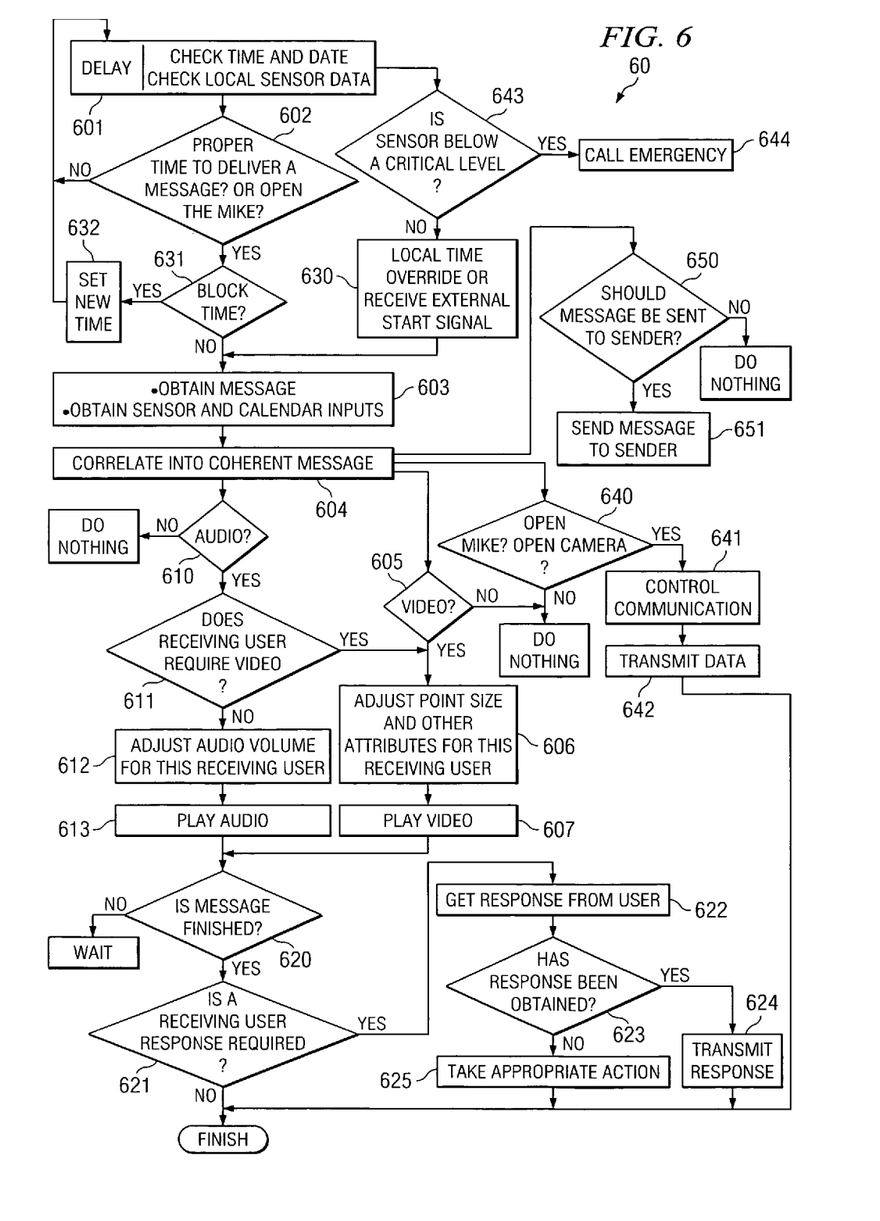

FIG. 6 shows one embodiment 60 of a flow chart for controlling the playing of messages for the message recipient at a time control set by the sending user. Process 601, under control of processor 22, memory 30, clock circuit 22 and, if desired one or more sensors 210-213 of FIG. 2, provides a time and date check on providers input from the sensors. Under process 602 a determination is made whether it is a proper time, or if a sensor has reached a condition set by the message sender to deliver a message or, optionally, open a microphone. If it is not time, the system "sleeps" for a while. When it is time, process 631 determines if it is a blackout time such that messages will not be delivered. This would occur, for example, if the system is set to display no messages between the hours of 10:00 p.m. and 6 a.m. regardless of the time set by the sender. Process 632 sets the new time. This new time can be the next unblocked time. In the example just presented, that time would be 6 am. However, the time entered by the sender could have been a category and not an actual time. Thus, the sender could have indicated that the associated message is to be delivered at the "wake-up" time (or any other category of time) set by the recipient. Thus, the recipient, or a system administrator, can set the category times for the recipient. These categories can be, for example, wake-up, breakfast, lunch, dinner, message receipt time, etc.

Overrides to the sender set time can be controlled under process 630 and in some situations the sending user could use a special code to override all blocks. For example, in an emergency the sender could send a message to a recipient regardless of the time. Another example of the use of the system would be for the recipient to wear a medical monitor (such as a heart or glucose monitor, etc.) and when the system senses that a predetermined dangerous condition exist, a message is played for the recipient telling the recipient what action should be taken. Thus, if a monitored sugar level drops below a critical point, a message is played saying, for example "Mom your sugar is low. Take a big white pill now!" If the sugar level continues to fall, the original message sender (or emergency personnel) can be notified. Thus, as an early warning, process 643, operating from a monitor input, controls the above-discussed message for the recipient by enabling process 630 and process 603 to assemble the proper message. However, if the sensor falls below a critical level, process 643 enables a call to 911 or other emergency personnel, via process 644.

Process 603 obtains and assembles each message and obtains proper sensor and calendar inputs under control of the attributes operating under control of processor 22 and memory 30. Process 604 correlates the message into a coherent message package. This could be both audio and video. If it is video, process 605 controls process 606 which in turn adjusts the point size and other stored protocol for the receiving user so that the point size and other protocol or are proper for this user. If the message is audio, process 610 could control the audio presentation. If this user requires a video presentation in addition to the audio, for example, a conversion of the spoken words into letters on the screen, then process 611 operates in conjunction with process 606 to adjust to the proper point size particular to this user.

Process 607 plays the video. Process 612 adjusts the audio volume for the particular user based on stored user protocol. Process 613 then controls the playing of the audio.

Process 620 determines if the message is finished and when it is a determination is made as to whether a response is required via process 621. If such a response is required, then process 622 obtains the response from the user. Process 623 determines that the response has been obtained and transmits the response to the location specified by the creator or sender of the message under control of process 624. Process 625 takes appropriate action if the response has not been obtained. In this case appropriate action could be a signal to an administrator or a call to an emergency responder, etc.

Process 640 controls the open microphone (or open camera) situation, as is discussed above, and should only be used under very controlled situations since such a situation would effectively open a microphone to allow a third party to listen (and perhaps view) in to sounds coming from the recipient without control by the recipient. This could be used, for example, to monitor a child by a remote parent, or for an adult child to monitor his/her aging parent to be certain that all is well. This monitoring would be at preset times controlled by sender. Process 641 controls communication and operates in conjunction with process 642 to transmit the data from the receiving user back to the original sending user.

The system could be designed to allow for reminders to the sender based on certain attributes being determined. One such attribute, could be, for example, an empty message queue. In such a situation, the sender would then be called, under control of processing 650 and 651, and reminded to send more messages (or other data). Also, other attributes such as medical condition, weather, etc., could prompt the recipients system to send a message back to a particular person pre-identified in the recipient's system.

Using the system described herein, a person (sending party) can communicate frequently with someone, such as a parent in a nursing home or a child away at school, even when the sending party is busy doing other things and might forget to make the call or to send an e-mail. The sender could send multiple messages each scheduled for a different play time. The messages could, if desired, contain attributes that tailor the message to conditions as they exist at the time the message is played.

Although the present embodiment of the invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system for recording video messages, said system comprising:
   a memory for storing at the recipient's location a time to play a particular video message at said system, said play time contained in a communication and said play time being later than the time said communication is received at said system;
   a device for playing said particular video message at a previously stored play time associated with said particular video message; and
   wherein said video messages are played at said play time without regard to any action taken by said message recipient.

2. The system of claim 1 wherein at least a portion of said particular video message is received concurrently with said play time for storage in said memory over a communication path extending from a location remote from said recipient's location.

3. The system of claim 1 wherein at least one of said stored play times has a call-back number associated therewith, said system further comprising;
   means for receiving from said message recipient a response to a played video message, said receiving means enabled at said play time; and
   means for enabling said response to be communicated to said call-back number.

4. The system of claim 1 wherein said play time is a plurality of different times.

5. The system of claim 1 wherein said memory is further operable for receiving video messages that do not have controlled play times associated therewith and wherein said system further comprises:
   a processor operable in response to instructions received with a message play time for controlling the play of at least one of said video messages not having controlled play times associated therewith.

6. The system of claim 5 wherein said last-mentioned video message is selected based on information available external to said last-mentioned video message at the time a received video message is played.

7. The system of claim 5 wherein the selection of said last-mentioned video message is controlled, at least in part, by information received from a message sender.

8. The system of claim 5 wherein the selection of said last-mentioned video message is controlled, at least in part, by local sensors.

9. The system of claim 8 wherein said sensors are selected from the list of thermometer, clock, GPS, calendar, physiological.

10. The system of claim 1 wherein a played one of said video messages is played continuously for a period of time as controlled by information received with said video message.

11. The system of claim 1 wherein said video messages are received by a plurality of memories in a broadcast mode, said memories associated with different receiving users.

12. The system of claim 1 further comprising an override control for playing selected ones of said video messages at a time established independent of said play time associated with said selected ones of said video messages.

13. The system of claim 1 wherein said device, at a play time, enables downloading of pre-identified messages stored at a location remote from said recipient's location.

14. The system of claim 1 further comprising:
   means for converting any received video message to a particular format, said particular format controlled by said recipient's system.

15. The system of claim 1 wherein said controlled play time is a message recipient specific time category, instead of a specific time.

16. A method for leaving a video message for a receiving party; said method comprising the steps of:
   establishing at a particular time a communication connection with a receiving party's memory device;
   providing at said particular time over an established communication connection to said memory device a message playing time for a video message to be displayed subsequently to said receiving party at said message playing time; and
   downloading to said memory device together with said message playing time an identification of a video message to be displayed on a display subsequently at said playing time.

17. The method of claim 16 wherein said providing step includes the step of:
   providing additional message displaying times for each said video message.

18. The method of claim 16 wherein said providing step includes the step of:
   providing multiple message times, each provided message time associated with a different message, each said message to be played at the message time associated therewith.

19. The method of claim 16 further comprising:
   playing said previously identified message at said message playing timer said playing under control of a device local to said memory device.

20. The method of claim 16 further comprising the step of:
   downloading together with said message playing time at least a portion of said message to be played at said playing time.

21. The method of claim 16 wherein at least a portion of said identified video message is located remote from said receiving party.

22. The method of claim 16 further comprising the step of:
   obtaining at said message playing time information obtained from said receiving party's location, said obtained information controlled, at least in part, by said message identification associated with said message playing time.

23. The method of claim 16 further comprising the step of:
   overriding said play time with a locally provided play time.

24. The method of claim 23 wherein said overriding playing time is a time category specific to said receiving party.

25. A messaging system comprising;
   a processor co-located with a potential message recipient for controlling receipt of incoming messages to said recipient; said processor operable for controlling interaction with a message sender such that attributes established by said sender can be associated with at least some received messages, said processor further operable for controlling playback of said message to said recipient at said co-location in accordance with said attributes and wherein at least one of said attributes is a time of said playback; said playback occurring without any action being required of said recipient; and
   wherein said time of said playback is modified by data associated with each particular message recipient.

26. The messaging system of claim 25 further comprising;
   sensors local to a message recipient, and
   wherein said time of said playback is controlled, at least in part, by data from one more of said local sensors.

27. The messaging system of claim 26 wherein said playback is to said message sender based upon data from at least one of said sensors local to said message recipient.

28. The messaging system of claim 25 further comprising:
   sensors local to a message recipient; and
   wherein said message played to said recipient is modified by data from at least one of said sensors.

29. The messaging system of claim 25 where at least one of said attributes is selected from the list of attributes consisting of: duration of playback time; number of times a message is to be repeated; actual time of day for repeating a message; response required to said message; additional data to be played with each message; open mike times for allowing a response from a message recipient to said message sender.

30. The system of claim 25 wherein at least one of said messages contains a call-back number, said system further comprising;
   a transmitter; and
   an input for receiving a response to a played message; and wherein said processor at the time of said playback enables said transmitter to send said response to said call back number.

31. The messaging system of claim 25 wherein said processor is operative to enable playing selected ones of said messages at a time established independent of said time associated with said selected ones of said messages.

32. A method for delivering messages to a recipient, said method comprising:
   creating a message to be sent to a recipient, each said created message having associated therewith a time to deliver said message to said recipient;
   storing each said created message in association with said message delivery time at a device local to said recipient;
   playing each said stored message under control of said local device for said recipient, and without any action being required of said recipient at said time associated with said stored message without action taken by said recipient at the time each said message is played, said playing occurring without a communication being established to said local device from a source external to said local device at said time each message is played; and
   adjusting said time associated with certain of said messages based upon requirements of said recipient.

33. The method of claim 32 wherein at least some of said stored messages contain portions that are based on information to be provided at the time said message is played, said information to be provided not being available when said message is created.

34. The method of claim 32 further comprising:
   adjusting attributes of any said played message for a recipient based on requirements of said recipient.

35. The method of claim 32 further comprising:
   obtaining data local to said recipient; and
   based upon said local data, sending a message to a message sender.

36. A system for recording messages, said system comprising:
   a memory for storing at the recipient's location a time to play a particular message at said system, said play time contained in a communication and said play time being later than the time said communication is received at said system;
   a device for playing said particular message at a previously stored play time associated with said particular message; and
   wherein at least one of said stored play times has a call-back number associated therewith, said system further comprising:
      means for receiving from said message recipient a response to a played message, said receiving means enabled at said play time; and
      means for enabling said response to be communicated to said call-back number.

37. The system of claim 36 wherein said messages are played at said play time without regard to any action taken by said message recipient.

38. The system of claim 36 wherein said play time is a plurality of different times.

39. The system of claim 36 wherein said memory is further operable for receiving messages that do not have controlled play times associated therewith and wherein said system further comprises:
   a processor operable in response to instructions received with a message play time for controlling the play of at least one of said messages not having controlled play times associated therewith.

40. The system of claim 39 wherein said last-mentioned message is selected based on information available external to said last-mentioned message at the time a received message is played.

41. The system of claim 39 wherein the selection of said-last-mentioned message is controlled, at least in part, by information received from a message sender.

42. The system of claim 39 wherein the selection of said last-mentioned message is controlled, at least in part, by local sensors.

43. The system of claim 36 further comprising an override control for playing selected ones of said messages at a time established independent of said play time associated with said selected ones of said messages.

44. The system of claim 36 wherein said device, at a play time, enables downloading of pre-identified messages stored at a location remote from said recipient's location.

45. The system of claim 36 further comprising:
   means for converting any received message to a particular format, said particular format controlled by said recipient's system.

46. The system of claim 36 wherein said controlled play time is a message recipient specific time category, instead of a specific time.

47. A system for recording messages, said system comprising:
   a memory for storing at the recipient's location a time to play a particular message at said system, said play time contained in a communication and said play time being later than the time said communication is received at said system;
   a device for playing said particular message at a previously stored play time associated with said particular message; and
   wherein said memory is further operable for receiving messages that do not have controlled play times associated therewith and wherein said system further comprises:
      a processor operable in response to instructions received with a message play time for controlling the play of at least one of said messages not having controlled play times associated therewith; and
      wherein said last-mentioned message is selected based on information available external to said last-mentioned message at the time a received message is played.

48. The system of claim 47 wherein said messages are played at said play time without regard to any action taken by said message recipient.

49. The system of claim 47 wherein said play time is a plurality of different times.

50. The system of claim 47 wherein the selection of said last-mentioned message is controlled, at least in part, by information received from a message sender.

51. The system of claim 47 wherein the selection of said last-mentioned message is controlled, at least in part, by local sensors.

52. A system for recording messages, said system comprising:
- a memory for storing at the recipient's location a time to play a particular message at said system, said play time contained in a communication and said play time being later than the time said communication is received at said system;
- a device for playing said particular message at a previously stored play time associated with said particular message; and
- wherein said messages are received by a plurality of memories in a broadcast mode, said memories associated with different receiving users.

53. The system of claim 52 wherein said messages are played at said play time without regard to any action taken by said message recipient.

54. The system of claim 52 wherein at least a portion of said particular message is received concurrently with said play time for storage in said memory over a communication path extending from a location remote from said recipient's location.

55. The system of claim 52 wherein at least one of said stored play times has a call-back number associated therewith, said system further comprising:
- means for receiving from said message recipient a response to a played message, said receiving means enabled at said play time; and
- means for enabling said response to be communicated to said call-back number.

56. The system of claim 52 wherein said play time is a plurality of different times.

57. The system of claim 52 wherein said memory is further operable for receiving messages that do not have controlled play times associated therewith and wherein said system further comprises:
- a processor operable in response to instructions received with a message play time for controlling the play of at least one of said messages not having controlled play times associated therewith.

58. The system of claim 57 wherein said last-mentioned message is selected based on information available external to said last-mentioned message at the time a received message is played.

59. The system of claim 57 wherein the selection of said last-mentioned message is controlled, at least in part, by local sensors.

60. The system of claim 59 wherein said sensors are selected from the list of thermometer, clock, GPS, calendar, physiological.

61. The system of claim 52 wherein said device, at a play time, enables downloading of pre-identified messages stored at a location remote from said recipient's location.

62. A messaging system comprising:
- a processor co-located with a potential message recipient for controlling receipt of incoming messages to said recipient; said processor operable for controlling interaction with a message sender such that attributes established by said sender can be associated with at least some received messages; said processor further operable for controlling playback of said message to said recipient at said co-location in accordance with said attributes and wherein at least one of said attributed is a time of said playback; said playback occurring without any action being required of said recipient; and:
- wherein at least one of said messages contains a call-back number, said system further comprising;
- a transmitter; and
- an input for receiving a response to a played message; and
- wherein said processor at the time of said playback enables said transmitter to send said response to said call back number.

63. The messaging system of claim 62 wherein said time of said playback is modified by data associated with each particular message recipient.

64. The messaging system of claim 62 further comprising:
- sensors local to a message recipient, and
- wherein said time of said playback is controlled, at least in part, by data from one more of said local sensors.

65. The messaging system of claim 64 wherein said playback is to said message sender based upon data from at least one of said sensors local to said message recipient.

66. The messaging system of claim 62 further comprising:
- sensors local to a message recipient; and
- wherein said message played to said recipient is modified by data from at least one of said sensors.

67. The messaging system of claim 62 wherein said processor is operative to enable playing selected ones of said messages at a time established independent of said time associated with said selected ones of said messages.

68. A method for delivering messages to a recipient, said method comprising:
- creating a message to be sent to a recipient, each said created message having associated therewith a time to deliver said message to said recipient;
- storing each said created message in association with said message delivery time at a device local to said recipient;
- playing each said stored message under control of said local device for said recipient; and without any action being required of said recipient at said time associated with said stored message without action taken by said recipient at the time each said message is played; said playing occurring without a communication being established to said local device from a source external to said local device at said time each message is played; and
- adjusting attributes of any said played messages for a recipient based on requirements of said recipient.

69. The method of claim 68 wherein at least some of said stored messages contain portions that are based on information to be provided at the time said message is played, said information to be provided not being available when said message is created.

70. The method of claim 68 further comprising:
- adjusting said time associated with certain of said messages based upon requirements of said recipient.

71. The method of claim 68 further comprising:
- obtaining data local to said recipient; and
- based upon said local data, sending a message to a message sender.

72. A method for delivering message to a recipient, said method comprising:
- creating a message to be sent to a recipient, each said created message having associated therewith a time to deliver said message to said recipient;
- storing each said created message in association with said message delivery time at a device local to said recipient; and
- playing each said stored message under control of said local device for said recipient, and without any action being required of said recipient at said time associated with said stored message without action taken by said recipient at the time each said message is played; said playing occurring without a communication being established to said local device from a source external to said local device at said time each message is played; and wherein at least some of said stored messages contain portions that are based on information to be provided at the time said message is played, said information to be provided not being available when said message is created.

73. The method of claim 72 further comprising:

adjusting said time associated with certain of said messages based upon requirements of said recipient.

74. The method of claim 72 further comprising:

adjusting attributes of any said played message for a recipient based on requirements of said recipient.

75. The method of claim 72 further comprising:

obtaining data local to said recipient; and based upon said local data, sending a message to a message sender.

* * * * *